Patented Sept. 26, 1950

2,523,337

UNITED STATES PATENT OFFICE 2,523,337

(BETA-NITROALKYL) AMINES AND PROCESSES FOR PRODUCING SAME

Carl T. Bahner, Jefferson City, Tenn.

No Drawing. Application May 1, 1947,
Serial No. 745,232

10 Claims. (Cl. 260—247)

My invention relates to (beta-nitroalkyl) amines and to methods for the production of same. More particularly, it relates to (beta-nitroalkyl)-amines having the following structural formula:

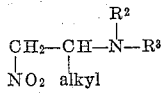

wherein $R^2$ is a substituent group selected from the class consisting of alkyl and the group

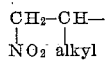

and $R^3$ is selected from a group consisting of hydrogen and, when connected with $R^2$, a 3-oxapentamethylene group.

My new (beta-nitroalkyl) amines may be produced by reacting ammonia and amines having the formula, $$R^2\text{—NH—}R^3$$

with nitroalkenes having the formula

wherein $R^2$ and $R^3$ have the values given above.

Among the nitroalkenes suitable for use in my process may be mentioned the following: 1-nitro-1-propene, 1-nitro-1-butene, 1-nitro-1-pentene, 4-methyl-1-nitro-1-pentene and 1-nitro-1-decene.

Among the amine compounds suitable for use in my process may be mentioned ammonia, methylamine, dimethylamine, ethylamine, diethylamine, isopropylamine, n-butylamine, di-n-butylamine, 2-ethylhexylamine, and morpholine.

Among the novel products of my invention may be cited the following: bis(1-nitro-2-butane)-amine, bis(1-nitro-2-pentane) amine, N-(1-nitro-2-butane) butylamine, N-(1-nitro-2-butane) morpholine, N-(1-nitro-2-butane)-N-(2-nitroisopropyl) methylamine.

In the past, a very limited group of (nitroalkyl) amines having an amino group attached to a primary carbon atom have been prepared by indirect means, such as by first reacting an alkyl or aryl amine with formaldehyde, and then reacting the resulting product with a nitroparaffin. I have now discovered that (beta-nitroalkyl)-amines having an amino group attached to a secondary carbon atom may be obtained directly by the reaction of nitroalkenes of the types disclosed above with ammonia, alkylamines, and heterocyclic amines.

In carrying out the reaction between nitroalkenes and amines, I prefer first to introduce the amine into a suitable reaction vessel equipped with an efficient stirring device and with means for heating and cooling the contents thereof. The amine may be dissolved in an inert or unreactive solvent, such as an alcohol, an ether, or a cyclic ether, to help in maintaining the mobility of the reaction mixture and to assist in heat transfer. The nitroalkene, either alone or similarly dissolved, is then added gradually with efficient stirring, and the contents of the reaction vessel are meanwhile preferably maintained at or below room temperature. The reaction is generally quite rapid, so that the process can ordinarily be completed within 15 to 30 minutes, if the cooling means is capable of holding the temperature at the desired level. The specified temperature range is preferable, since at higher temperatures, nitroalkenes tend to polymerize and, of course, the reaction mixture should be maintained at temperatures below those at which the nitroalkene tends to polymerize. But it will be apparent that my process is operative to some extent at temperatures substantially above room temperature. Temperatures below about 35° C. are most practical. After the reaction is completed, the solvent is removed by evaporation or distillation, and the product may be isolated in a number of ways, such as by crystallization or distillation, or by preparation and crystallization of the hydrochloride.

In carrying out the reaction between ammonia and nitroalkenes, an aqueous solution of ammonia may be used; however, I prefer to pass ammonia gas into a solution of the nitroalkene in ether or other suitable inert solvent.

The maximum ratio in which nitroalkenes may be made to react with ammonia or amines, varies, as disclosed in the following table:

| Amine Compound | Molar ratio, Nitroalkene: Amine |
|---|---|
| $NH_3$ | Two |
| Primary | One |
| Secondary | One |

The following specific examples will further illustrate my invention:

*Example I*

Ammonia reacted with 1-nitro-1-butene in 1:2 molar ratio to form bis(1-nitro-2-butane) amine:

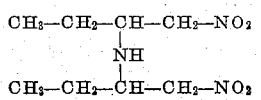

Dry ammonia gas was passed intermittently over a period of 20 minutes into a solution of 10.1 grams of 1-nitro-1-butene in 10 ml. of dry isopropyl ether. An ice-water bath was used to maintain the temperature of the reaction mixture between 15 and 30° C. After the reaction was completed, the ether was removed by vacuum distillation, and a product weighing 10.9 grams was obtained, having a specific gravity ($d_4^{25}$) of 1.1205 and an index of refraction ($n_D^{25}$) of 1.467. To establish the identity of the product, a crystalline derivative was prepared by treatment with phenyl isothiocyanate. Analysis of the crystalline derivative: Calculated for $C_{15}H_{24}N_4O_4S$: 50.83% carbon, 6.26% hydrogen; found: 50.73, 50.95% carbon, 6.26, 6.41% hydrogen.

*Example II*

Treatment of 11.9 grams of 1-nitro-1-pentene with ammonia as described in Example I gave 11.7 grams of a product comprising primarily bis(1-nitro-2-pentane)amine:

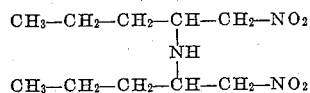

*Example III* n-Butylamine reacted with 1-nitro-1-pentene in 1:1 molar ratio to form N-(1-nitro-2-pentane)-butylamine:

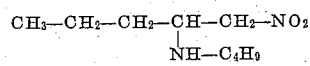

One-tenth mole (5.75 grams) of 1-nitro-1-pentene was added to one-tenth mole (3.66 grams) of n-butylamine at a temperature of 15 to 30° C. during a period of 5 minutes. The reaction was rapid. The reaction product was dissolved in isopropyl ether and converted into the hydrochloride by treatment with dry hydrogen chloride at room temperature. A viscous liquid separated from the ether solution and crystallized on standing. The crystals were washed with a mixture of n-butyl alcohol and isopropyl ether, and were then dried. Analysis: Calculated for $C_9H_{21}N_2O_2Cl$, 15.8% chloride; found, 15.8% chloride.

*Example IV*

Morpholine reacted with 1-nitro-1-butene in equimolar ratio to give N-(1-nitro-2-butane)-morpholine:

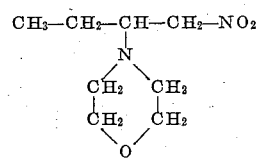

The reaction was carried out by adding the nitroalkene to morpholine, with stirring, over a period of 20 minutes, the temperature being maintained at 15 to 30° C. by use of an ice bath. The product tended to decompose during distillation; so the picrate (M. P. 103–106° C., depending on the rate of heating) was prepared to establish the structure of the product. Analysis of the picrate: Calculated for $C_{14}H_{19}N_5O_{10}$: 40.29% carbon, 4.59% hydrogen; found: 40.44% carbon, 4.73% hydrogen.

While the above examples illustrate the preferred embodiments of my invention, it will be understood that departures may be made therefrom within the scope of the description and claims. In general it may be said that any modifications or equivalents that would ordinarily occur to those skilled in the art are to be considered as lying within the scope of my invention.

The (beta-nitroalkyl)amines of my invention are useful in numerous fields. Thus, for example, (beta-nitroalkyl)amines containing lower alkyl groups and a plurality of nitro groups may be used as explosives or as intermediates in the manufacture of additives for Diesel fuel. Reduction of the nitro groups to amino groups yields compounds which are of value in the preparation of detergents. The reduction of products of my invention having nitro groups at the ends of chains gives diamino compounds that are particularly useful in the preparation of linear polymers of the nylon type. Tertiary alkylamines having a primary amino group on one of the alkyl radicals have found use in chemotherapy, especially in the production of antimalarials. Owing to the presence of the nitro groups in my compounds, it will be apparent that they may be converted into oximes, hydroxylamines, ketones, and nitro alcohols. Numerous uses for such compounds will readily occur to those skilled in the art.

In accordance with the foregoing specification, I claim as my invention:

1. Beta-nitroalkyl amines having the general formula

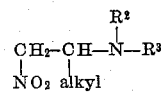

wherein $R^2$ is a substituent group selected from the class consisting of alkyl and the group

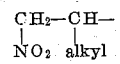

and $R^3$ is selected from a group consisting of hydrogen and, when connected with $R^2$, a 3-oxapentamethylene group.

2. Bis(1-nitro-2-butane)amine.
3. N-(1-nitro-2-pentane)butylamine.
4. N-(1-nitro-2-butane)morpholine.
5. A process for producing (beta-nitroalkyl) amines which comprises mixing and reacting a nitroalkene having the formula

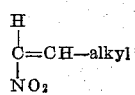

with an amine compound having the formula $R^2$—NH—$R^3$ in which $R^2$ is a substituent group selected from the class consisting of alkyl and the group

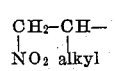

and $R^3$ is selected from a group consisting of hydrogen and, when connected with $R^2$, a 3-oxapentamethylene group, the reaction mixture being maintained at temperatures not substantially exceeding 35° C., the nitroalkene and amine compound being reacted in molecular proportions ranging from about 1:1 to 2:1 depending upon the number of hydrogen atoms attached to the nitrogen atom of the amine compound and the final product desired.

6. The process of claim 5 wherein the reaction is carried out in the presence of an inert, unreactive solvent.

7. A process for producing (beta-nitroalkyl)

amines which comprises mixing ammonia with a nitroalkene having the formula

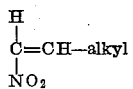

while agitating and maintaining the temperature at a value not substantially above 35° C., and separating the desired (beta-nitroalkyl) amine, the nitroalkene and ammonia being reacted in molecular proportions ranging from about 1:1 to 2:1 depending upon the end product desired.

8. A process for producing bis(1-nitro-2-butane) amine which comprises agitating a solution of 1-nitro-1-butene in an inert solvent, passing ammonia into said solution, maintaining the mixture at a temperature not substantially exceeding 35° C. until the reaction is complete and separating bis(1-nitro-2-butane) amine from the mixture, the nitrobutene and ammonia being reacted in the molecular proportions of about 2 to 1.

9. A process for producing N-(1-nitro-2-pentane) butylamine which comprises adding 1-nitro-1-pentene to n-butylamine with stirring, maintaining the mixture at a temperature not substantially exceeding 35° C. until the reaction is complete, and separating the N-(1-nitro-2-pentane) butylamine from the reaction mixture, the nitropentene and the butylamine being reacted in the molecular proportions of about 1 to 1.

10. A process for producing N-(1-nitro-2-butane) morpholine which comprises adding 1-nitro-1-butene to morpholine, with stirring, maintaining the mixture at a temperature not substantially exceeding 35° C. until the reaction is complete and separating the N-(1-nitro-2-butane) morpholine from the reaction mixture, the nitrobutene and the morpholine being reacted in the molecular proportions of about 1 to 1.

CARL T. BAHNER.

REFERENCES CITED

The following references are of record in the file of this patent:

UNITED STATES PATENTS

| Number | Name | Date |
|---|---|---|
| 2,292,212 | Dickey et al. | Aug. 4, 1942 |
| 2,381,408 | Senkus | Aug. 7, 1945 |
| 2,419,506 | Senkus | Apr. 22, 1947 |

OTHER REFERENCES de Mauny, "Bull. Soc. Chim." (5) vol. 4, pp. 1451–1460 (1937).

Senkus, "J. Am. Chem. Soc.," vol. 68, pp. 10–12 (Jan. 1946).

Johnson, "J. Am. Chem. Soc., vol. 68, pp. 12–14 (Jan. 1946).